UNITED STATES PATENT OFFICE.

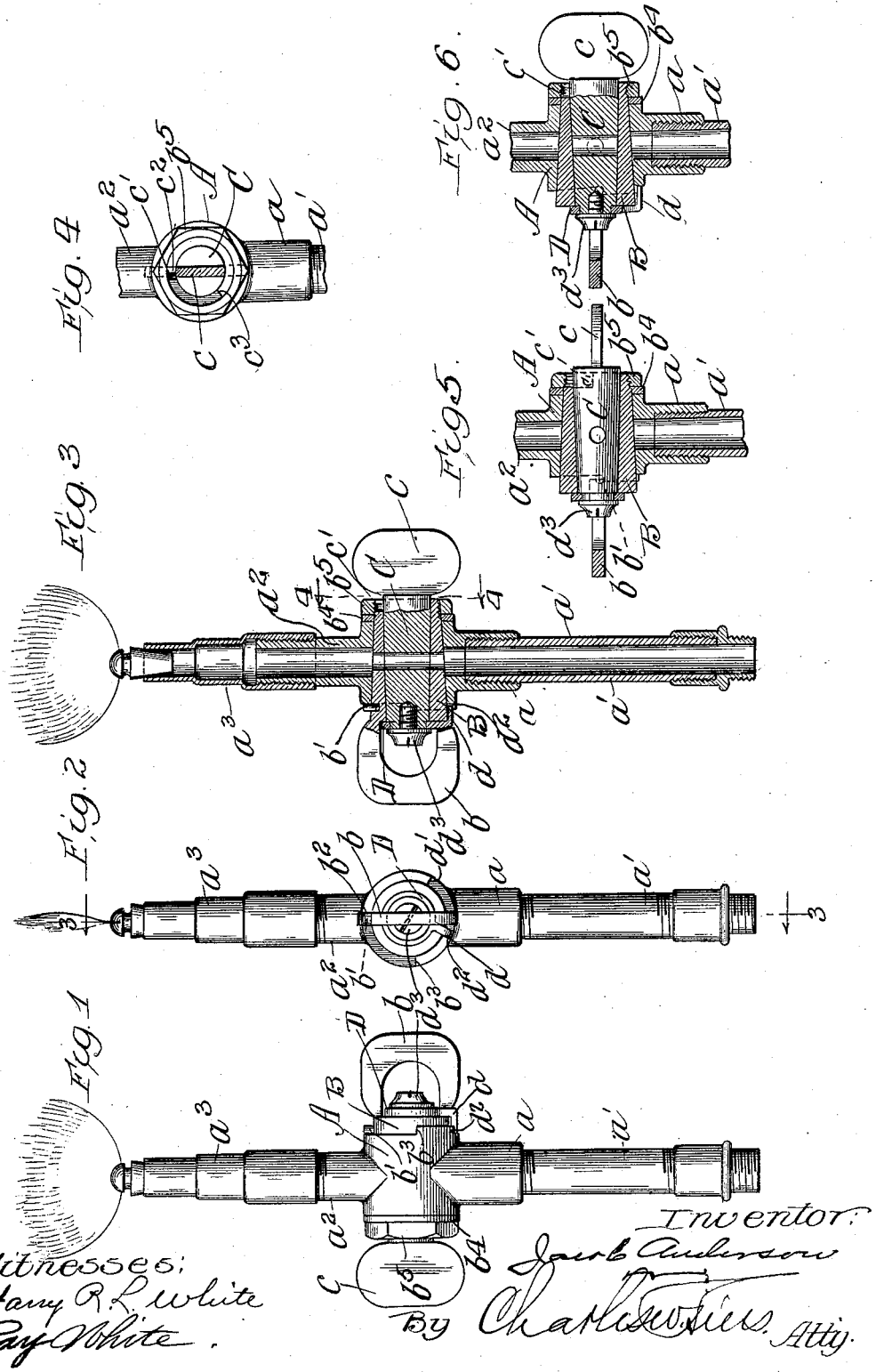

JACOB ANDERSON, OF CHICAGO, ILLINOIS.

VALVE AND COCK.

No. 903,158.  Specification of Letters Patent.  Patented Nov. 10, 1908.

Application filed May 20, 1907. Serial No. 374,684.

*To all whom it may concern:*

Be it known that I, JACOB ANDERSON, a citizen of the United States, and a resident of the city of Chicago, in the county of Cook and State of Illinois, have invented certain new and useful Improvements in Valves and Cocks; and I do hereby declare that the following is a full, clear, and exact description of the same, reference being had to the accompanying drawings, and to the letters of reference marked thereon, which form a part of this specification.

This invention relates to improvements in valves and cocks, and is shown embodied as a gas valve or cock, though adaptable for many other uses.

In gas valves or cocks as heretofore constructed it has been impossible for the owner or mistress when leaving a servant or children in charge or in the house to adjust the individual jets to prevent the servant, child or any other unauthorized person from turning on the gas, or to adjust the gas jet to permit the gas to be burned until turned off and to prevent turning it on again by the same key whereby it was turned off.

It is an object of this invention to provide a valve having a plurality of coacting closures, any of which acts to cut off the gas but only one of which can turn it on again.

It is a further object of this invention to provide a simple, durable and cheap valve adapted for use wherever desired to prevent unauthorized opening of the same.

The invention consists in the matters hereinafter described and more fully pointed out and defined in the appended claims.

In the drawings: Figure 1 is a side elevation of a device embodying my invention. Fig. 2 is a similar view taken at a rightangle with the same. Fig. 3 is a section taken on line 3—3 of Fig. 2. Fig. 4 is a section taken on line 4—4 of Fig. 3. Fig. 5 is a fragmentary section showing the valve closed by actuation of either plug. Fig. 6 is a fragmentary section with the outer or opening plug in the same position as shown in Fig. 5 and illustrating the effects when the inner plug is rotated.

As shown in said drawings: A, represents a casing of any suitable size and material and which is provided with an internally threaded inlet end $a$, for connection with the supply pipe $a'$, and an externally threaded outlet end $a^2$, in alinement with the inlet end and adapted for engagement with the gas jet $a^3$, or another pipe. Said casing is provided with a conically tapered bore and rotatably engaged therein is an outer hollow tapered plug closure B, having oppositely disposed transverse apertures adapted to register with the inlet and outlet of the casing. Integral with said closure is an actuating key $b$, and a stop $b'$, is threaded into or otherwise provided on the closure and at its limits of movement abuts against shoulders $b^2$—$b^3$, as shown formed by cutting a recess in the casing A and which indicates open and closed positions respectively. A washer $b^4$, is engaged on the smaller end of the plug closure, against which bears a nut $b^5$, threaded on the end of said closure and preventing longitudinal movement thereof.

Rotatably engaged in the complemental bore in said plug closure B is a plug closure C having less taper and having a wing or key $c$ for manual actuation. A pin $c'$, or other suitable shoulder is rigidly engaged to said plug closure C and is adapted to abut against shoulders or stops $c^2$—$c^3$ formed as shown by recessing the threaded end of the tubular plug closure B. The opposite end of said plug closure is reduced in diameter and fitted on said reduced end is a washer D having an integral stop $d$ which contacts at its opposite limits of movement shoulders or stops $d'$—$d^2$ at the same end of the casing and beneath the aforesaid shoulders $b^2$—$b^3$, and a nut $d^3$ is threaded into the end of the plug closure C and firmly secures said washer in place.

The operation is as follows: In the position shown in Fig. 3 the plug valve closures B and C are both turned to their extreme right hand position and the stop $c'$, on the closure C abuts against the shoulders $c^2$ on the end of the plug closure B and in this position the apertures through said closures are in alinement with each other and with the inlet and outlet. The valve may now be turned off by actuation of either closure but can then only be turned on by actuation of the plug closure B. When the closure B is rotated to the left it carries said closure C which is contained therein, with it until the stop $b'$ abuts against the shoulder $b^3$ in which position the valve is closed. On the other hand if the plug closure C is rotated to the right from the position shown in Fig. 3 it likewise rotates the closure B by the stop $c'$ engaging the shoulder $c^2$ on the plug B rotating both until the stop $b'$ engaged to the closure B engages the stop $b^3$, as before described and it is obvious that the valve remains closed when either is actuated to the position shown in Fig. 5. If now the plug C is actuated to the left in attempting to open the valve, it rotates until the stop $c'$, engages the shoulder $c^3$, at which time the stop $d$ carried by said plug closure engages the shoulder $d^2$, thereby preventing further rotation of the plug closure, which would otherwise rotate said plug B until the apertures were in register with the inlet and outlet to open the cock. The plug C may be rotated in either direction without opening the valve, the stop $d$ limiting its movement by abutting against the shoulders $d'$—$d^2$. To open the valve the plug B must be rotated to the right when the shoulder $c^2$ engaging the pin $c'$ on the plug C both closures simultaneously rotate to open position. For the purpose of preventing any one but the authorized person from opening the valve a small casing may be built to inclose the actuating key $b$ for the plug B.

Changes in construction may be made and I therefore do not desire to limit this application otherwise than necessitated by the prior art.

I claim as my invention:

1. In a valve the combination with coacting valve closures adapted by actuation of either to close the valve and parts on one closure contacted by parts on the other whereby actuation of one of the closures adjusts both to open position.

2. A valve comprising coacting closures one only of which is adapted to open the valve.

3. A valve comprising rotatable plug closures, either of which is adapted to close the valve and only one of which is adapted to open the valve.

4. A valve comprising a plurality of concentric rotatable plug closures, means limiting the movement thereof in opening the valve and one of said closures adapted by actuation thereof to adjust all of the closures to open position.

5. In a valve of the class described the combination with a casing of coacting closures therein, one of said closures adapted to close the valve and the other closure adapted to open the valve independently of actuation of the first named closure.

6. In a valve the combination with a casing of a hollow plug closure therein having oppositely disposed apertures, a plug closure journaled in said hollow closure and also having oppositely disposed apertures which are adapted to register with those of the other closure, a wing or key on each plug adapted when either is actuated to operate the closures to close the valve, said valve opened by actuation of one only of the closures and stops limiting the movement of said closures.

7. In a device of the class described the combination with a valve casing of a plurality of closures therein, each provided with apertures, means for actuating one of said closures to bring said apertures in alinement to open the valve, said valve closed by actuation of either closure.

8. In a device of the class described the combination with a casing of interfitting valve closures therein and each apertured, means for manually actuating one of the closures to close the valve and the other closure to bring said apertures into register to open the valve and means limiting the movement of each closure in opening the valve.

9. A valve comprising a casing having a threaded outlet and a threaded inlet and a plurality of interfitting plug closures in said casing either adapted to be manually actuated to close the valve and one of said plug closures adapted to open the valve after the valve has been closed by either closure.

10. A gas valve or the like comprising a casing and two closures therefor each adapted to close the valve independently of the other, and one only capable of opening the valve.

11. A gas valve or the like comprising a casing and two valve closures therein either adapted to close the valve and one only to open the valve and mutually engaging parts on said valve closures whereby actuation of the opening valve closure adjusts both to open position.

12. A gas valve or the like comprising a casing and two valve closures therein, either adapted to close the valve and one only to open the valve, mutually engaging external parts on said valve closures whereby actuation of the opening valve closure adjusts both to open position and means at each end of the closures for securing the same in operative position.

In testimony whereof I have hereunto subscribed my name in the presence of two subscribing witnesses.

JACOB ANDERSON.

Witnesses:
K. E. HANNAH,
J. W. ANGELL.